United States Patent
Moeschen-Siekmann et al.

(10) Patent No.: US 8,567,595 B2
(45) Date of Patent: Oct. 29, 2013

(54) ENDLESS ANNULAR BALER BELT MADE OF RUBBER OR RUBBER-LIKE MATERIALS

(71) Applicant: ContiTech Transportbandsysteme GmbH, Hannover (DE)

(72) Inventors: Michael Moeschen-Siekmann, Noerten-Hardenberg (DE); Carsten Behrens, Bilshausen (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 13/888,010

(22) Filed: May 6, 2013

(65) Prior Publication Data

US 2013/0240334 A1    Sep. 19, 2013

Related U.S. Application Data

(63) Continuation of application No. PCT/EP2011/066170, filed on Sep. 19, 2011.

(30) Foreign Application Priority Data

Nov. 26, 2010    (DE) .......................... 10 2010 060 828

(51) Int. Cl.
*B65G 15/34*    (2006.01)

(52) U.S. Cl.
USPC ............................... 198/847; 100/88; 56/341

(58) Field of Classification Search
USPC ......... 198/846, 847, 689.1; 414/24.5; 100/88; 56/341, 343
See application file for complete search history.

(56) References Cited

U.S. PATENT DOCUMENTS

| 3,874,609 | A | * | 4/1975 | Larson | 414/24.5 |
| 4,518,647 | A | * | 5/1985 | Morrison | 198/847 |
| 4,550,557 | A | | 11/1985 | Vissers et al. | |
| 4,788,900 | A | * | 12/1988 | Berkers | 100/88 |
| 4,832,672 | A | * | 5/1989 | Bielfeldt | 198/847 |
| 4,838,016 | A | * | 6/1989 | Frogbrook et al. | 56/341 |
| 5,426,928 | A | * | 6/1995 | Frimml et al. | 56/341 |
| 6,170,246 | B1 | | 1/2001 | Underhill | |
| 6,290,818 | B1 | * | 9/2001 | Romanski | 198/846 |
| 6,427,728 | B1 | * | 8/2002 | Maguire et al. | 198/847 |
| 7,055,425 | B2 | * | 6/2006 | Viaud et al. | 100/88 |
| 2010/0251685 | A1 | | 10/2010 | Muma | |
| 2012/0015572 | A1 | | 1/2012 | Behrens | |

FOREIGN PATENT DOCUMENTS

DE    102 43 727 C1    7/2003

OTHER PUBLICATIONS

International Search Report dated Dec. 1, 2011 of international application PCT/EP2011/066170.

* cited by examiner

*Primary Examiner* — James R Bidwell
(74) *Attorney, Agent, or Firm* — Walter Ottesen P.A.

(57) ABSTRACT

An annular baler for agricultural use includes at least one annular baler belt made of rubber or rubber-like materials with an embedded core defining a reinforcement. The annular baler belt has ventilation bores which are distributed in a regular or irregular pattern around the periphery thereof and extend through the annular baler belt.

11 Claims, 3 Drawing Sheets

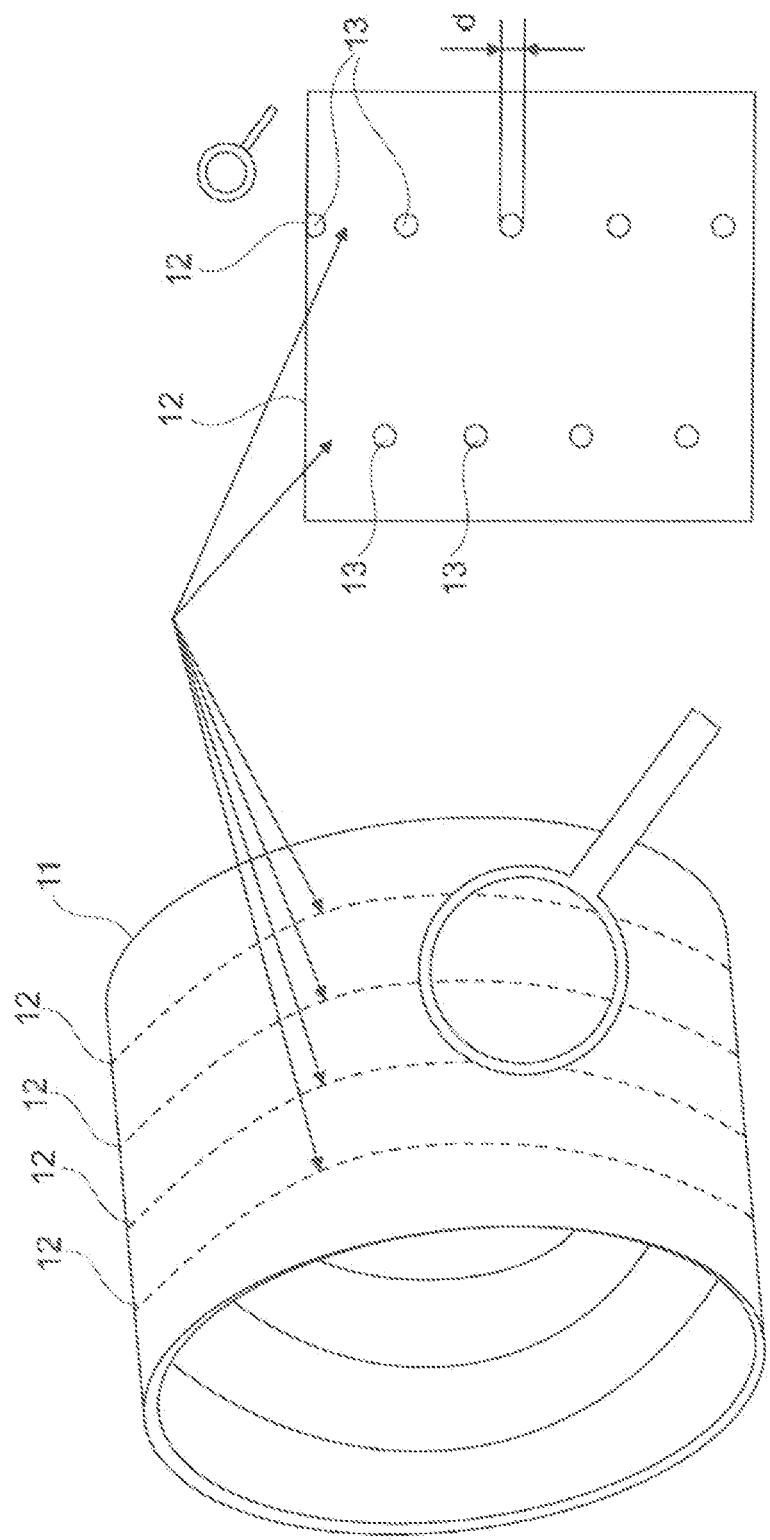

ENDLESS ANNULAR BALER BELT MADE OF RUBBER OR RUBBER-LIKE MATERIALS

CROSS REFERENCE TO RELATED APPLICATIONS

This application is a continuation application of international patent application PCT/EP2011/066170, filed Sep. 19, 2011, designating the United States and claiming priority from German application 10 2010 060 828.9, filed Nov. 26, 2010, and the entire content of both applications is incorporated herein by reference.

FIELD OF THE INVENTION

The invention relates to an endless annular baler belt made of rubber or rubber-like materials with an embedded core of a reinforcement.

BACKGROUND OF THE INVENTION

It is known to arrange multiple endless individual baler belts next to one another within an annular baler, for example in hay harvesting machines (U.S. Pat. No. 4,550,557; U.S. Pat. No. 6,170,246 B1). The gaps occurring between the individual belts cause losses of the baled material. It has therefore already been attempted to reduce the number of individual belts. The use of only a single baler belt over the entire working width has so far failed for the reason that, when there is only one baler belt in the annular baler, there are increased instances of bulging in the middle of the baler belt, attributable to insufficient degassing of the baled material. The baler belt surface of the single baler belt isolates the gas formation of the baled material.

Endless baler belts are known for example from DE 102 43 727 C1 and U.S. patent application publication 2012/0015572.

SUMMARY OF THE INVENTION

The invention is based on the object of providing an annular baler of the type described at the beginning that makes it possible to use annular baler belts of great width, without the gas formation of the baled material being able to have adverse effects.

The object is achieved according to the invention by the endless annular baler belt having venting bores distributed over the periphery thereof and penetrating the annular baler belt. The venting bores provide sufficient degassing of the baled material during the baling operation. This advantageously results in a highly compacted bale.

DETAILED DESCRIPTION OF THE INVENTION

In an advantageous embodiment of the invention, the venting bores are arranged in an ordered matrix. This makes it possible for the annular baler belt to be perforated by machine.

The venting bores are preferably arranged one behind the other on a line running over the periphery. This linear alignment of the venting bores in a series of holes allows the aimed-for introduction of the venting bores in predefined regions of the annular baler belt.

In an advantageous embodiment of the invention, parallel running peripheral series of holes are distributed over the width of the annular baler belt. The venting bores lie one behind the other on multiple parallel planes.

The number of venting bores over the periphery is chosen according to the baled material to be processed. An advantageous division of holes of venting bores arranged in a matrix is obtained in the range from 10 to 50 mm in the running direction.

In a further advantageous embodiment of the invention, the venting bores are irregularly distributed over the entire periphery of the belt. This irregular distribution is of advantage whenever the transverse stiffness of the annular baler belt is not to be weakened.

In an advantageous embodiment of the invention, the venting bores are provided with a bore diameter of 2 to 7 mm. The diameter range from 2 to 7 mm leads to good degassing conditions for the baled material to be processed, such as straw, hay or silage.

The invention minimizes losses in annular balers, because the annular baler can be equipped with fewer baler belts or even just one baler belt over the entire working width.

The use of fewer or even just one baler belt has the advantage of minimizing or eliminating the time-consuming selection of baler belts of the same length or individual setting of each baler belt in the annular baler to achieve precise running of the baler belt in the annular baler.

If it is intended to feed the baled material to the annular baler in a moist state, at least a large proportion of the moisture can be removed through the venting bores during the baling operation.

The individual baler belts for an annular baler With multiple endless individual baler belts are usually produced from a wide baler belt by making longitudinal cuts. If this starting baler belt comprises a woven fabric as a reinforcement, there is an unraveling of the fabric at the cut edges. This has the effect that the rubber edges of the individual baler belts are damaged. Using the baler belt according to the invention over the entire baling width obviates the need for a longitudinal cut to be made through a starting baler belt. A wear-resistant rubber edge of the baler belt that is obtained during production is therefore retained.

A further advantage is that of less contamination of the annular baler as a result of the reduced losses through gaps.

BRIEF DESCRIPTION OF THE DRAWINGS

The invention will now he described with reference to the drawings wherein:

FIG. 1 shows a continuous annular baler belt with peripherally running series of venting bores;

FIG. 2 shows a developed view of a detail of the annular baler belt according to FIG. 1;

DESCRIPTION OF THE BEST AND VARIOUS EMBODIMENTS

A preferred embodiment of a continuous annular baler belt 11 is represented in FIG. 1. Four series holes 12 lying parallel next to one another are arranged over the width of the annular baler belt 11. These series of holes have venting bores 13 arranged one behind the other at regular intervals (shown as a detail in FIG. 2). The venting bores 13 of one series of holes 12 are arranged offset in relation to the venting bores 13 of the adjacent series of holes 12. The diameter of the venting bores 13 is 5 mm.

Figure 4:
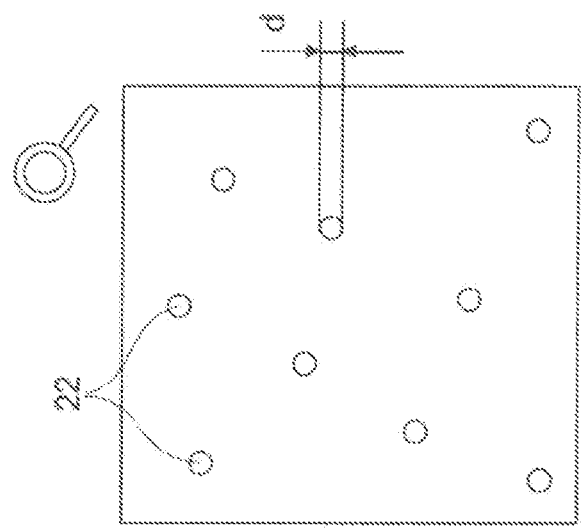
FIG. 4. shows a developed view of a detail of the annular baler belt according to FIG. 3; and, FIG. 5 shows a side-view of an annular baler belt comprising outer rubber topsheet 500, fabric reinforcement structure 510 and an inner rubber topsheet 520.
Figure 3:
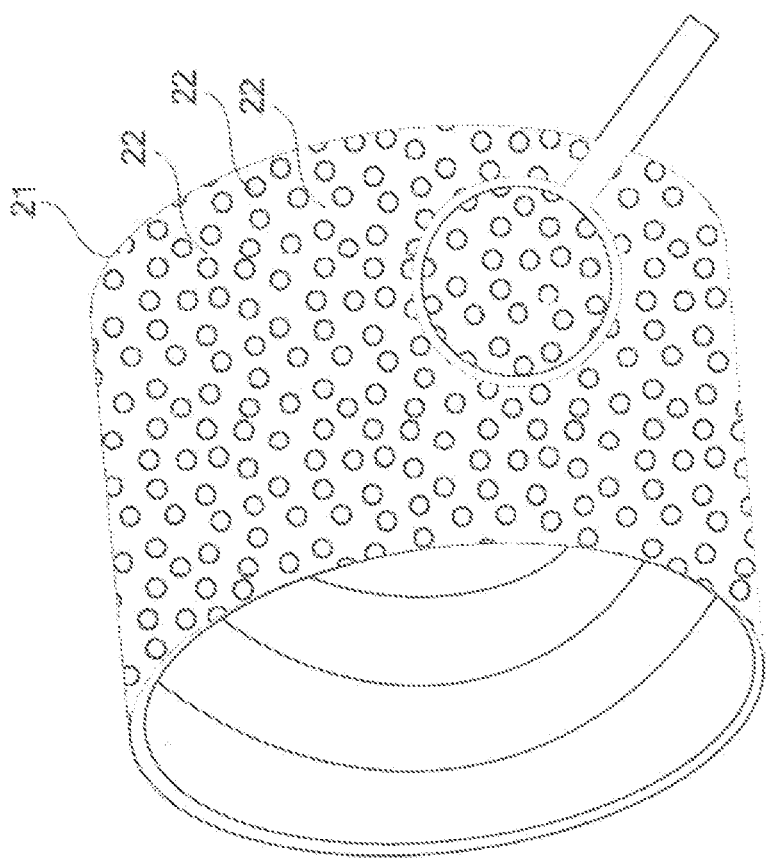
FIG. 3 shows a continuous annular baler belt with venting bores freely distributed over the periphery.

The continuous annular baler belt 21 that is represented in FIG. 3 likewise comprises an inner rubber topsheet and an outer rubber topsheet, between which a fabric reinforcement is arranged. The annular baler belt 21 is provided with venting bores 22 distributed irregularly over the periphery thereof. In FIG. 4, a schematic view of the distribution of the venting bores 22 is shown in a view of a detail, the diameter of the venting bores being 5 mm.

Figure 5:
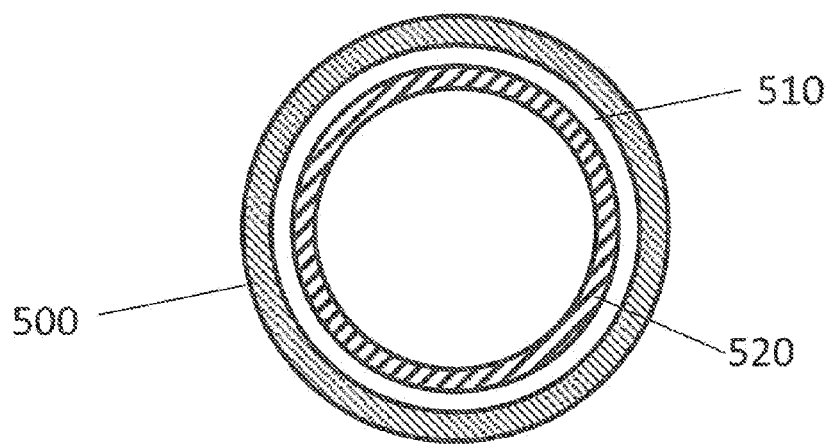

FIG. 5 shows an annular baler belt comprising an outer rubber topsheet 500 and an inner rubber topsheet 520, between which a fabric reinforcement structure 510 is arranged.

It is understood that the foregoing description is that of the preferred embodiments of the invention and that various changes and modifications may be made thereto without departing from the spirit and scope of the invention as defined in the appended claims.

What is claimed is:

1. An endless annular baler belt comprising:
   an embedded core defining a reinforcement; and,
   said endless annular baler belt having a plurality of venting bores distributed over the periphery thereof and extending through the annular baler belt.

2. The endless annular baler belt as claimed in claim 1, wherein the venting bores are arranged in an ordered matrix.

3. The endless annular baler belt as claimed in claim 1, wherein the venting bores are arranged one behind the other on a line running over the periphery.

4. The endless annular baler belt as claimed in claim 3, wherein a parallel running peripheral series of holes are distributed over a width of the annular baler belt.

5. The endless annular baler belt as claimed in claim 3, wherein a spacing of holes of the venting bores from one another in the running direction is of from 10 to 50 mm.

6. The endless annular baler beat as claimed in claim 1, wherein the venting bores are arranged in irregular distribution over the periphery of the annular baler belt.

7. The endless annular baler belt as claimed in claim 1, wherein the diameter of the venting bores is of from 2 to 7 mm.

8. The endless annular baler belt as claimed in claim 1, wherein the baler belt is made of rubber.

9. The endless annular baler belt as claimed in claim 1, wherein the reinforcement is made of a fabric.

10. A continuous annular baler belt comprising:
    an outer rubber layer defining an outer periphery;
    an inner rubber layer;
    a core defining a reinforcement and being embedded between said outer and inner layers; and,
    a plurality of venting bores distributed over said outer periphery and extending through all of said layers.

11. The continuous annular baler belt of claim 10, wherein said reinforcement is made of a fabric.

* * * * *